July 25, 1961 R. P. SULLIVAN 2,993,984
GAS SHIELDED A.C. ARC WORKING
Filed March 25, 1959
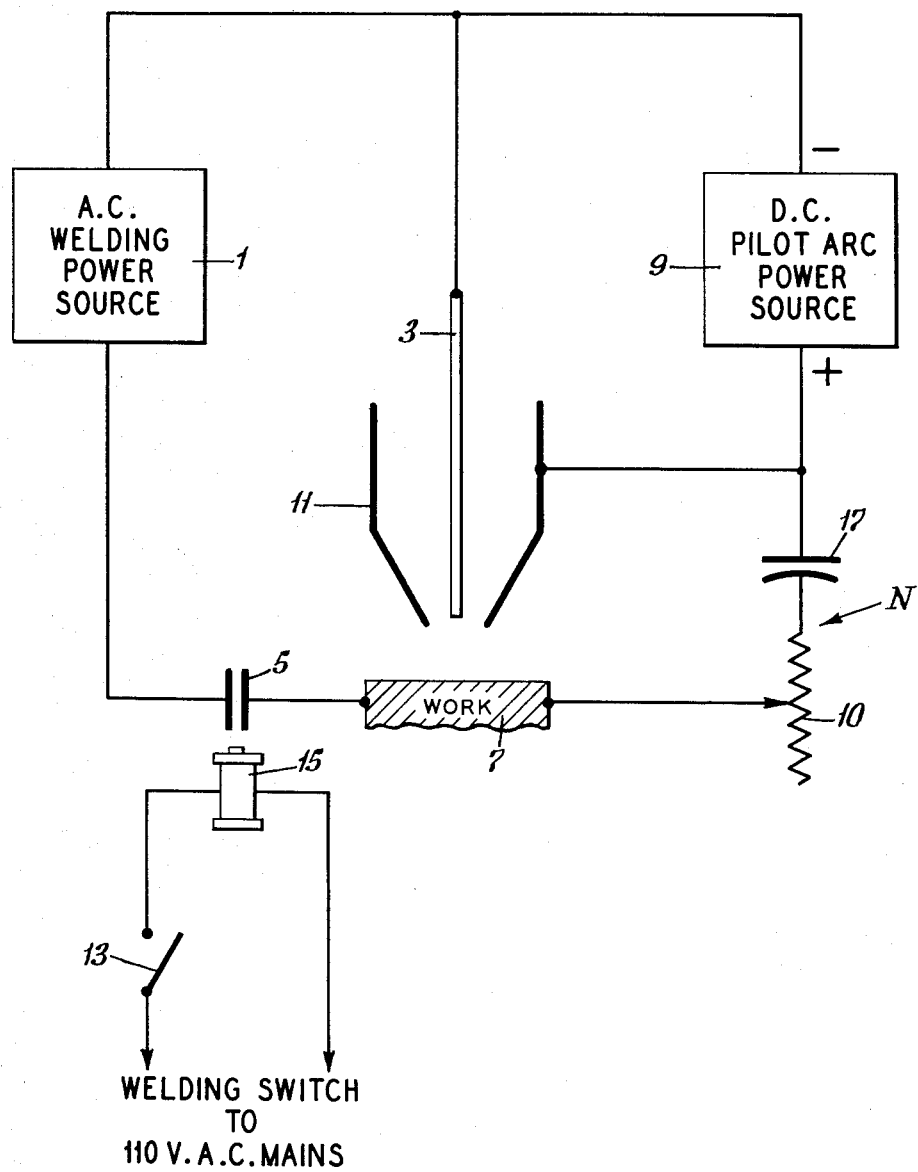
WELDING SWITCH
TO
110 V. A.C. MAINS
INVENTOR
RAYMOND P. SULLIVAN
BY
Barnwell P. King
ATTORNEY

United States Patent Office 2,993,984
Patented July 25, 1961

2,993,984
GAS SHIELDED A.C. ARC WORKING
Raymond P. Sullivan, Jersey City, N.J., assignor to Union Carbide Corporation, a corporation of New York
Filed Mar. 25, 1959, Ser. No. 801,787
1 Claim. (Cl. 219—131)

This invention relates to gas shielded alternating current arc work and, more particularly, to work-in-circuit refractory or non-consumable electrode alternating current arc welding of metals, such as aluminum and magnesium, having refractory oxides on their surface, preferably in a suitable arc shielding gas such as argon alone or argon mixed with other gases.

According to the present invention a pilot arc is struck between a main electrode and an adjacent auxiliary electrode to start and maintain an alternating current welding arc between such main electrode and the work to be welded and providing in the circuit between such auxiliary electrode and work an RC network which, in conjunction with such pilot arc, eliminates undesirable rectification of the alternating welding current, and also reduces substantially the open circuit voltage required by such A.C. arc.

Metals, such as aluminum, are characterized by refractory oxides which rapidly form on their surfaces. It is well known in the art that the welding of aluminum requires a reverse polarity or "cleaning" cycle to remove impurities, such as refractory oxides, from the metal surface. Reverse polarity D.C. is objectionable because of extreme heating of the main electrode. For this reason metals, in the class of aluminum, are usually welded with an alternating current main welding arc. Unfortunately, an A.C. welding arc, employing conventional open circuit voltages, has undesirable complex electrical effects that take place during that time when the main electrode becomes positive (reverse polarity), the main undesirable effect being that the voltage necessary for reigniting the reverse polarity cycle cannot be supplied by conventional A.C. welding power supplies. Such A.C. welding apparatus requires a stabilizer which performs the function of reigniting the arc when arc current passes through zero on reversal.

Up until now several ways of overcoming the above-mentioned undesirable effects have been proposed. One of these methods was the use of a balanced wave high open circuit (150 v.) power supply with a high frequency unit. The high frequency was employed to initiate the main welding arc. The high open circuit voltage was enough to reignite the reverse polarity cycle of the A.C. welding arc, that is, "stabilize" such arc. However, a unit of such type is very expensive and, also, the high open circuit voltage is potentially dangerous in the hands of welding operators.

Another method employed in the A.C. welding of aluminum was the use of an unbalanced wave power supply equipped with a high frequency unit. In such type unit the high frequency was superimposed upon the A.C. and was used to initiate the main A.C. welding arc and to provide a spark of reignition of the reverse polarity cycle of the A.C. welding arc, that is, "stabilize" the A.C. welding arc. Such unit generates high frequency radiation which sometimes interferes with various forms of radio communications.

As noted in Patent No. 2,840,761:

"The high-frequency stabilizer used in arc welding, in accordance with the teachings of the prior art, is a spark gap oscillator. Such an oscillator when energized produces wave trains of damped radio-frequency oscillations accompanied by radiation which may interfere with authorized communication services such as broadcast receivers. During the past seven years, the Federal Communications Commission has promulgated an order that the arc welding industry either give up the use of the spark gap type stabilizer or develop a stabilizing oscillator which will meet limits set up by the Commission. A radiation limit of 10 microvolts per meter at a distance of one mile from the stabilizer has been established by the Commission. This is equivalent to a field strength of 59 microvolts per meter measured at any point on the periphery of a circle of 1000 feet radius having its center substantially at the arc welder.

"In spite of this demand from the Federal Communications Commission, and in spite of its repeated assertions ultimately to permit the use only of stabilized arc welders meeting Commission limits, we have encountered no tangible evidence that the arc welding industry has produced a stabilized arc welder which meets the limits. When the Commission first promulgated its order about seven years ago, it set a date by which all the arc welders should meet the condition imposed and the arc welding industry started to develop a suitable arc welder. Prior to the expiration of the date, the industry reported that it had been unsuccessful and the new date was set. Since then the Commission has, at the request of the industry, repeatedly extended the date by which it would permit only welders meeting the condition, and between each new limiting date and the prior one, the welding industry devoted considerable time and effort to develop a suitable stabilizer arc welder, but was entirely unsuccessful."

A third proposal involved an unbalanced wave power supply with a pilot arc. In such system the pilot arc was used to ignite the main welding arc and to "stabilize" the alternating welding current. However, it was found in such method that a power supply of at least 80 volts had to be employed in order to obtain consistently good welds. Most standard A.C. welding power sources, however, are in the vicinity of 72 to 75 volts open circuit.

Therefore, it is an object of this invention to provide an A.C. welding system which avoids the use of high frequency for starting and stabilizing the A.C. welding arc.

Another object is to eliminate the need for relatively high open circuit voltage power supplies for stabilizing an A.C. welding arc.

It is a further object to provide an A.C. welding system which utilizes power supplies usually having an open circuit voltage of from 72 to 75 volts.

Briefly, the invention comprises a combination of a D.C. pilot arc and RC network which cooperate to provide the necessary means for starting an A.C. main welding arc and for stabilizing such arc.

In the drawing:
The single figure is a simplified circuit diagram embodying the invention.

Referring now to such drawing, a standard A.C. main welding power source 1 is connected to a main welding electrode 3 and, through relay contacts 5, to a work electrode 7 to be welded. The negative side of a D.C. pilot arc power supply 9 is connected to the main welding electrode 3; the positive side being connected to gas nozzle or cup 11 and also through an RC network N to work electrode 7.

A pilot arc is initially struck between the main welding electrode 3 and auxiliary electrode (cup) 11 with a tungsten probe. Direct current flows from the pilot arc source 9 to electrode 3 to cup 11 and back to pilot arc source 9.

At this stage there is an ionized gas path in the vicinity of the arc drawn between main electrode 3 and cup 11. When the operator brings the torch into proximity with the work 7, the ionized gas in the vicinity of the pilot arc will impinge upon the work 7 to be welded. The operator then closes switch 13, energizing welding contactor relay 15 which operates to close contacts 5, thus completing the circuit from the main A.C. welding power source 1 to the work electrode 7 to the main electrode 3. As a result, main A.C. welding current flows from the A.C. welding source 1 through electrode 3 across the ionized gas path provided by the pilot arc to the work 7. Thus, the main A.C. welding arc is established.

After the straight polarity half cycle of the A.C. voltage is completed and the A.C. voltage has passed through zero, the open circuit voltage of the A.C. power supply 1 plus the load voltage of the pilot arc source 9 will appear across the RC network N, charging condenser 17 with the sum of the A.C. voltage and D.C. voltages. The condenser 17 will discharge through variable controlling resistor 10 across the gap between cup 11 and work 7 through the ionized shielding gas atmosphere already established by the pilot arc. The voltage discharge of condenser 17 is sufficient, in cooperation with the ionized gas atmosphere established by the pilot arc, to establish a current flow from work 7 through such ionized atmosphere to main electrode 3, thus igniting the reverse polarity cycle of the A.C. main welding arc, and providing "stabilization" of said arc.

The following parameters represent a typical example of welding conditions for making a fillet weld on 0.125 inch No. 1100 aluminum according to the invention:

Welding current—135 amperes A.C. (72 volts open circuit)
D.C. rectifier pilot arc supply 9—105 volts open circuit—(5 amperes)
Condenser 17—8 mfd.
Rheostat 10—10 ohms
Electrode 3—⅛ in. 2 percent thoriated
Argon gas—20 cfh.

If at the completion of the straight polarity cycle, conduction through the main welding arc on the reverse polarity cycle is immediately obtained, the full open circuit voltage of the A.C. main welding power source will not appear across the RC network N. In such peculiar instances the voltage discharge of the RC network is not needed to fire the reverse polarity half cycle of the A.C. voltage. However, this peculiar condition does not exist consistently enough to obtain good welding results without the stabilizing effect of the combination of a pilot arc and RC network.

Novelty of the invention resides in a combination of a D.C. pilot arc and an RC network to start and stabilize an A.C. main welding arc without the need for a high-frequency unit, and with an A.C. power source, the open circuit voltage of which, required by such arc, is substantially reduced.

What is claimed is:

A gas shielded arc working system comprising the combination with a gas shielded arc torch provided with a refractory metal main electrode surrounded by a gas cup and means for supplying arc shielding gas to such cup for flow therefrom around the end of said electrode, and means for connecting an A.C. power source across said electrode and a work electrode, said torch having an auxiliary pilot arc electrode associated with said cup, and a D.C. pilot arc powder source connected across said main and auxiliary electrodes for ionizing the gas discharged from such cup; of an RC network comprising an adjustable resistor and a condenser connected in series across said auxiliary and work electrodes for energizing said A.C. work arc at the start of every reverse polarity half cycle of such current, said RC network operating in conjunction with the D.C. pilot arc to reduce the open circuit voltage of said A.C. power source needed by such A.C. arc.

References Cited in the file of this patent

UNITED STATES PATENTS

| 2,473,917 | Steinert et al. | June 21, 1949 |
| 2,773,170 | Barthel | Dec. 4, 1956 |
| 2,892,072 | Miller | June 23, 1959 |